United States Patent [19]

Luhleich et al.

[11] Patent Number: 4,604,249

[45] Date of Patent: Aug. 5, 1986

[54] METHOD OF PRODUCING COMPOSITE ARMOR PLATE BODIES

[75] Inventors: Hartmut Luhleich, Düren; Francisco J. Dias, Jülich, both of Fed. Rep. of Germany

[73] Assignee: Kernforschungsanlage Jülich GmbH, Jülich, Fed. Rep. of Germany

[21] Appl. No.: 672,170

[22] Filed: Nov. 16, 1984

Related U.S. Application Data

[63] Continuation of Ser. No. 233,474, Feb. 11, 1981, abandoned.

[30] Foreign Application Priority Data

Feb. 15, 1980 [DE] Fed. Rep. of Germany ....... 3005586

[51] Int. Cl.[4] ............................................ C04B 35/34

[52] U.S. Cl. .................................... 264/29.5; 264/60; 264/63; 264/65; 427/294; 427/431

[58] Field of Search ...................... 264/60, 63, 65, 66, 264/29.5; 427/431, 294

[56] References Cited

U.S. PATENT DOCUMENTS

| | | | |
|---|---|---|---|
| 3,927,187 | 12/1975 | Luhleich et al. . | |
| 3,928,662 | 12/1975 | Kaneko et al. | 427/331 |
| 3,947,550 | 3/1976 | Fitchmun | 264/63 |
| 3,963,651 | 6/1976 | Nickel et al. . | |
| 4,009,143 | 2/1977 | Luhleich | 106/284 |
| 4,023,979 | 5/1977 | Luhleich et al. . | |
| 4,055,451 | 10/1977 | Cockbain | 264/60 |
| 4,059,682 | 11/1977 | Luhleich et al. . | |
| 4,060,592 | 11/1977 | Luhleich et al. . | |
| 4,293,512 | 10/1981 | Luhleich | 264/58 |
| 4,514,346 | 4/1985 | Luhleich et al. | 264/63 |

*Primary Examiner*—James Derrington
*Attorney, Agent, or Firm*—Frishauf, Holtz, Goodman & Woodward

[57] ABSTRACT

A molded porous silicon carbide body in the shape of an armor plate, made by coking a mixture of carbon and silicon powder coated with an organic binder to which some silicon carbide powder may be added, and then rapidly raising the temperature to a level at which silicon carbide is formed, is impregnated so that its pores are filled with steel or a steel alloy to produce a plate that has the hardness and stiffness of silicon carbide and the toughness of metal. The plate has superior resistance to hollow or shaped explosive charges. The lower density provided by the silicon carbide favors its use in armored vehicles.

3 Claims, No Drawings

METHOD OF PRODUCING COMPOSITE ARMOR PLATE BODIES

This application is a continuation of application Ser. No. 233,474, filed Feb. 11, 1981 now abandoned.

This invention concerns armor plates or articles, of composite material, particularly for armored vehicles.

Generally, steel or steel alloys have been used as the material for armor plates. Such armor plates have high resistance to bending, shear and crushing forces. They have the disadvantage, however, that their manufacture is expensive, their specific weight (density) is high and, even when provided in a thickness as high as is regarded as tolerable for vehicle armor, they provide no sufficient security against hollow explosive charges, sometimes known as "shaped" explosive charges.

THE INVENTION

It is an object of the invention to provide armor plate of a new composite material particularly suitable for armored vehicles which will provide, along with sufficient strength for withstanding bending, shear and crushing forces, also protection against the impact of hollow or shaped explosive charges.

Briefly, the plate is made of a porous molded body of silicon carbide in the shape of an armor plate and having great hardness and crush resistance, which is impregnated or filled by soaking with a metal composition having elasticity and a high resistance to bending, shear and crushing and, in particular, consisting of steel or a steel alloy.

Such a plate can be made, in accordance with the invention, by using such a metal as the molten impregnating material for a porous silicon carbide body made according to the method disclosed both for the making of the silicon carbide body and of the composite body in which the pores are filled with metal in our co-pending application filed concurrently herewith, Ser. No. 233,475, and now abandoned and continued by application Ser. No. 418,679, now U.S. Pat. No. 4,514,346. As there disclosed, grains or particles of a mixture of silicon and carbon powders, to which it may be useful to add a predetermined proportional amount of silicon carbide, are coated with an organic binder by suspending the particles in a binder solution, from which the binder is thereafter precipitated by introducing the suspension into a liquid serving to precipitate the binder on the particles as an even coating and the mass thus produced is then molded into a so-called "green" body by plastic deformation of the binder material, after which the green molding is coked at a maximum temperature in the range from 800° to 1000° C. In a following process step, the molded body is then treated for conversion of the starting material into silicon carbide by heating in an inert gas atmosphere under pressure of at least about 1 bar serving to keep down the evaporation of silicon, the heating up being performed rapidly as the temperature of 1400° C. is approached, up to a temperature in the range between 1400° to 1600° C. For the silicon carbide matrix of the armor plate of the present invention, it is particularly advantageous to utilize the feature of the process described in the aforesaid copending application by which the formation of the grains or particles coated with binder, a solution of an organic binder is first formed, and the grains or particles are then suspended in the solution to form a slurry or mud. The suspension is then introduced by means of a nozzle into a liquid capable of precipitating the binder, so that the grains or particles are evenly coated with the binder. In an immediately following process step, the mass of grains or particles thus coated with a binder film are separated from the precipitation liquid by filtration or decantation and then dried. The rest of the process is as outlined above. In this connection, reference is made to U.S. Pat. Nos. 4,009,143 and 4,023,979, co-pending U.S. patent application Ser. No. 94,120, filed Nov. 14, 1979 now U.S. Pat. No. 4,293,512, and to German Pat. Nos. 20 40 252, 21 33 044, 21 32 492 and 23 60 982.

The molding of the green body to the exact shape of the desired armor plate is also carried out in the same way as the molding of bodies described in our concurrently filed co-pending application, namely by extruding or in a diepress where only slight pressure needs to be applied. In order to obtain enlargement of the silicon carbide crystallites and, accordingly, an increased stiffening of the metal filling, as well as an enlargement of the pores of the plate-shaped silicon carbide body, the already chemically converted body is tempered at temperatures between 1700° C. and 2100° C. In a further process step, the pores of plate-shaped silicon carbide body is then evacuated in a pressure vessel and is thereafter immersed in a metal bath provided for the purpose, for soaking or impregnation, with a pressure of up to 50 bar being exerted on the metal. Thereafter, the plate soaked or impregnated with the molten metal is taken out of the metal bath and, after draining away the metal still adhering to the surface of the plate, is slowly cooled. If necessary, any metal still adhering to the surface of the plate is removed by etching it away. The porosity of the SiC body generally lies in the range from 30 to 70% and is preferably from 40 to 50%, while the pore size depends upon the grain size of the starting material and is usually from about 1 to 500 μm and preferably from 5 to 30 μm. The powders of the starting material are generally grinding-mill products of a maximum grain size of up to 100 μm, preferably up to 60 μm, for carbon and generally of up to 50 μm, and preferably up to 10 to 20 μm, for silicon.

EXAMPLE 100 g of silicon powder (grain size <53 μm; passage through a 270 mesh sieve) and 14 g of a carbon powder consisting of 90% by weight of electrographite and 10% by weight of wood charcoal (principal grain size 10 μm–20 μm) was suspended in a solution of 61 g of a phenol-formaldehyde resin binder in 600 ml of ethanol and 6 ml of glacial acetic acid. The suspension was warmed to 50° C. with stirring and after half an hour it was cooled to room temperature. The suspension was then squirted through a nozzle into a water stream at 150° C., in which step 10 liters of water were used. The mass thus formed was warmed with stirring to 40° C. and after half an hour cooled to room temperature. After settling of the mud thereby formed, the liquid was decanted and the mud filtered and dried.

175 g of the powder so formed was evenly spread in a square molding box measuring 10.8 cm on a side and was pressed warm with a ram in a press. After cooling, the plate so produced, having a thickness of 1.1 cm and measuring 10.8 cm on each edge was removed from the mold and coked in an argon stream by heating up to 800° C. The dimensions of the plate after coking measured 10.0 cm on each edge and 1.0 cm in thickness. Thereafter, the plate was placed in an oven capable of being evacuated and was evacuated there and flushed with argon. Under an argon pressure of 1 bar, the plate was heated up to 1350° C. and held for five minutes at this temperature. Then, with a high heating-up rapidity (of about 5° C. per minute), it was heated up to 1600° C. and thereafter cooled down. The siliconized plate was then placed in a vacuum pressure vessel, in which there was located a bath of chrome-nickel steel at a temperature of 1600° C. The vacuum vessel was first evacuated and then the plate was completely immersed in the steel bath while the vacuum pressure vessel was raised to an argon pressure of 20 bar. Then, the plate was taken out of the bath and after the running off of excess steel and slow cooling to room temperature, the plate was removed from the vacuum pressure vessel.

The foregoing example is illustrative and it must be understood that variations and modifications of the process and the manufacture of the armor plate product are possible within the inventive concept.

We claim:

1. A method of making armor plate comprising the steps of:

making a porous body of silicon carbide in the shape of an armor plate element, having open and through-penetrating pores therein, by preparing a deformable mass of particles of silicon and carbon, all coated with an organic binder by suspending and mixing particles of silicon and particles of carbon in a binder solution from which the binder is thereafter precipitated by introducing the suspension into a liquid serving to precipitate the binder on the particles as an even coating, molding said mass into armor plate shape by extrusion or in a low pressure diepress, coking the binder of the molded body at a temperature in the range from 800° C. to 1000° C., raising the temperature to a temperature in the range from 1400° C. to 1600° C. to form silicon carbide and cooling the body thus produced;

evacuating the pores of said body in a pressure vessel, then soaking said body in a melt of a metallic material selected from the group consisting of steel and steel alloys under pressure of at least 1 bar to fill said pores with said metallic material, and then cooling said body and thereby solidifying the metallic material.

2. A method of making armor plate comprising the steps of:

making a porous body of silicon carbide in the shape of an armor plate element having open and penetrating pores therein by preparing a deformable mass of particles of silicon and carbon with a minor admixture of silicon carbide, all coated with an organic binder by suspending and mixing said particles in a binder solution from which the binder is thereafter precipitated by introducing the suspension into a liquid serving to precipitate the binder on the particles as an even coating, molding said mass into armor plate shape by extrusion or in a low pressure diepress, coking the binder of the molded body at a temperature in the range from 800° C. to 1000° C., raising the temperature to a temperature in the range from 1400° C. to 1600° C. to form silicon carbide and cooling the body thus produced;

evacuating the pores of said body in a pressure vessel, then soaking said body in a melt of a metallic material selected from the group consisting of steel and steel alloys under pressure of at least 1 bar to fill said pores with said metallic material, and then cooling said body and thereby solidifying the metallic material.

3. A method as defined in claim 1 or claim 2, in which after the formation of silicon carbide the porous silicon carbide body is tempered to increase grain and pore size by heating said body up to a temperature in the range from 1700° C. to 2100° C.

* * * * *